July 3, 1962 H. B. STANDLEY 3,042,450
MOTOR VEHICLE SEAT HEAD REST
Filed June 12, 1961

INVENTOR
HENDERSON B. STANDLEY
BY James M. Drysdale
ATTORNEY 3,042,450
MOTOR VEHICLE SEAT HEAD REST
Henderson Burk Standley, 552 S. Hillside, Wichita, Kans.
Filed June 12, 1961, Ser. No. 116,569
1 Claim. (Cl. 297—399)

This invention relates to attachments or devices used in automobiles and in particular an inverted U-shaped bracket having sections extending upwardly from the ends of the legs of said bracket and providing arcuate arms extending downwardly therefrom and adapted to be positioned to nest over the upper edge of the back of a seat.

The lower ends of the arcuate arms extend downwardly below the inverted U-shaped bracket and thence laterally and horizontally to be joined together, thus forming an attachment consisting of one continuous piece of wire.

The primary object of this invention is to provide means to hold a head rest without attaching fittings and which is easy to put on and take off.

Another object of the invention is to provide a head rest of the type described which is of simple inexpensive construction and which is easy to manufacture, to assemble and disassemble, and can be placed in position on the seat without tools or attaching fittings.

A further object of this invention is, therefore, to provide an attachment for motor vehicles whereby a cushion may be supported above the upper edge of the back of a seat to provide a head rest.

A still further object of my invention consists in so constructing a head rest that it will be comprised of a single piece of wire, the ends of which are joined together thus forming one continuous whole.

With these and other objects and advantages in view, the invention consists in certain novel features of construction and combination of parts, the essential elements of which are set forth in the appended claim, and a preferred embodiment of which is hereinafter shown with reference to the drawing which accompanies and forms a part of this specification.

In the drawing.

Like reference characters refer to like parts in both views of the drawing.

Figures 1, 2:
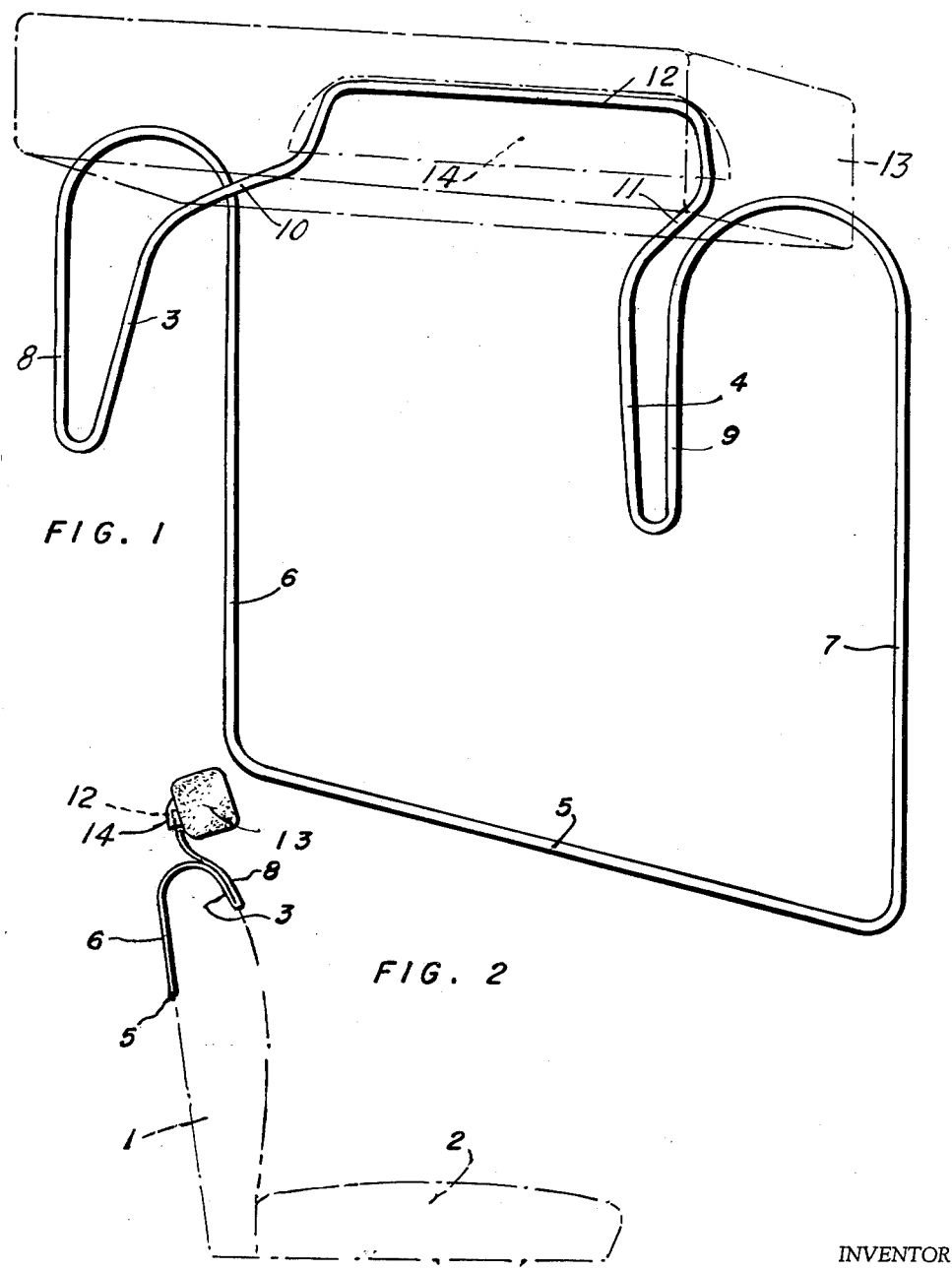
FIG. 1 is a view illustrating the construction of the head rest cushion frame.
FIG. 2 is an end elevational view showing the frames with a cushion thereon and with the frame and cushion positioned on the upper edge of the back of a seat.

I have here shown my device in place upon the back 1 of any suitable seat assembly 2.

The head rest bracket or frame of this invention includes a bracket formed with a pair of inverted U-shaped end members 3 and 4 with the lower ends of the arms 6 and 7 thereof connected by a horizontal crossbar 5 thus forming an attachment or device consisting of one continuous piece of wire.

The other ends 8 and 9 of the end members 3 and 4 are bent over and extend upwardly forming posts 10 and 11, the upper ends of which are connected by a horizontal crossbar 12 which forms a support for the cushion 13, the end view of which is shown in FIG. 2.

Presumably, there is nothing novel in the cushion itself which is of well known form and is provided at its rear side with a sleeve 14 which fits over the horizontal crossbar 12 and is held in place thereby in the well known manner without the use of tools or attaching fittings.

It will, of course, be understood that various changes may be made in the form, details, arrangements and proportions of the various parts throughout the views without departing from the scope of my invention.

It will thus be seen that there is provided a motor vehicle head rest in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

I claim:

A motor vehicle head rest formed of a cushion and a single continuous piece of wire which comprises an inverted U-shaped bracket having end members provided with arms which project downwardly therefrom and are adapted to be positioned to nest over the upper edge of the back of a seat, a horizontal crossbar connecting the lower ends of two of said arms to form a head rest of one continuous piece said end members also being provided with arms which are bent over and extend upwardly forming posts the upper ends of which are connected only by a single horizontal crossbar which forms a cushion support by fitting under a sleeve on the rear side of the cushion.

References Cited in the file of this patent
UNITED STATES PATENTS

| | | |
|---|---|---|
| 818,854 | Rossdam | Apr. 24, 1906 |
| 2,553,385 | Ruth | May 15, 1951 |
| 2,622,660 | Stratton | Dec. 23, 1952 |
| 2,897,878 | Nungovan | Aug. 4, 1959 |